United States Patent
Lee et al.

(10) Patent No.: US 9,508,113 B2
(45) Date of Patent: Nov. 29, 2016

(54) PIPELINE SYSTEM INCLUDING FEEDBACK ROUTES AND METHOD OF OPERATING THE SAME

(71) Applicants: Samsung Electronics Co., Ltd., Suwon-si (KR); KONGJU NATIONAL UNIVERSITY INDUSTRY-UNIVERSITY COOPERATION FOUNDATION, Gongju-si (KR)

(72) Inventors: Won-jong Lee, Seoul (KR); Hyun-sang Park, Gongju-si (KR); Young-sam Shin, Hwaseong-si (KR); Jae-don Lee, Hwaseong-si (KR)

(73) Assignees: Samsung Electronics Co., Ltd., Suwon-si (KR); Kongju National University Industry-University Cooperation Foundation, Gongju-si (KR)

( * ) Notice: Subject to any disclaimer, the term of this patent is extended or adjusted under 35 U.S.C. 154(b) by 0 days.

(21) Appl. No.: 14/271,916

(22) Filed: May 7, 2014

(65) Prior Publication Data

US 2015/0103082 A1    Apr. 16, 2015

(30) Foreign Application Priority Data

Oct. 11, 2013  (KR) .................. 10-2013-0121508

(51) Int. Cl.
*G06T 1/20* (2006.01)
*G06T 15/06* (2011.01)

(52) U.S. Cl.
CPC ........... *G06T 1/20* (2013.01); *G06T 15/06* (2013.01)

(58) Field of Classification Search
None
See application file for complete search history.

(56) References Cited

U.S. PATENT DOCUMENTS

| | | | |
|---|---|---|---|
| 5,594,702 A * | 1/1997 | Wakeman et al. | 365/230.05 |
| 6,392,655 B1 * | 5/2002 | Migdal | G06T 15/04 345/582 |
| 6,919,896 B2 * | 7/2005 | Sasaki et al. | 345/505 |
| 2005/0223124 A1 | 10/2005 | Reed | |
| 2005/0237337 A1 * | 10/2005 | Leather | G06T 15/04 345/582 |
| 2009/0157969 A1 | 6/2009 | Harding et al. | |
| 2009/0322752 A1 * | 12/2009 | Peterson et al. | 345/426 |
| 2010/0259536 A1 | 10/2010 | Toksvig et al. | |

FOREIGN PATENT DOCUMENTS

| | | |
|---|---|---|
| JP | 3796390 B2 | 4/2006 |
| KR | 10-0887012 B1 | 3/2009 |

\* cited by examiner

*Primary Examiner* — Joni Richer
(74) *Attorney, Agent, or Firm* — NSIP Law

(57) ABSTRACT

A pipeline system includes input buffers, a relay for controlling withdrawal of data stored in the input buffers, and functional blocks for performing one or more processing operations. A method of operating a pipeline system includes withdrawing data from one of input buffers and performing different one or more processing operations.

20 Claims, 6 Drawing Sheets

PIPELINE SYSTEM INCLUDING FEEDBACK ROUTES AND METHOD OF OPERATING THE SAME

CROSS-REFERENCE TO RELATED APPLICATIONS

This application claims the benefit under 35 USC 119(a) of Korean Patent Application No. 10-2013-0121508, filed on Oct. 11, 2013, in the Korean Intellectual Property Office, the entire disclosure of which is incorporated herein by reference for all purposes.

BACKGROUND

1. Field

The following description relates to a pipeline system including feedback routes and a method of operating the same.

2. Description of the Related Art

Many recent processors have a pipeline structure for performance improvement. Accordingly, data processing is typically divided into a plurality of stages and a plurality of data items are processed in parallel during different stages of one cycle so that the data processing per cycle is maximized.

The stages of the pipeline structure are formed of functional blocks that perform different functions of data processing. In the pipeline structure, since the data processing is performed while the data items sequentially pass through the functional blocks, when latency increases during data processing in a specific functional block, other functional blocks in a previous stage must be stalled.

That is, if a functional block of a next stage is not ready to receive data, a functional block of a current stage is stalled. Accordingly, a functional block of the previous stage may be stalled too, and thus all of the functional blocks may be stalled. This is referred to as a deadlock.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a pipeline includes input buffers; a relay configured to control withdrawal of data stored in the input buffers; and functional blocks configured to perform one or more processing operations, wherein some of the input buffers are feedback input buffers corresponding to feedback routes; and at least one of the functional blocks is configured to feed back processing result data.

The one or more processing operations may include different processing operations; the functional blocks may be configured to perform the different processing operations sequentially and based on the data received from the input buffers; and the at least one functional block may be configured to feed back the processing result data to a corresponding feedback input buffer from among the feedback input buffers.

One of the input buffers may be a first in first out (FIFO) buffer.

The number of the feedback routes may be equal to the number of the feedback input buffers.

The capacities of the feedback input buffers may be determined based on the feedback routes.

The capacities of the feedback input buffers may be equal to sums of capacities of the functional blocks through which the fed-back data passes.

The relay may control withdrawal of the data based on state signals received from the input buffers.

The state signals of the input buffers may include at least one of a half-full flag (HF) signal, an empty flag (EF) signal, and a full flag (FF) signal; and the relay may preferentially withdraw data of an input buffer whose state signal is the HF signal.

The relay may preferentially withdraw data from the feedback input buffers in response to the state signals of the input buffers being the same.

The data received from the input buffers may be ray data, and the functional blocks may be configured to perform at least one of a ray-node hit test and a ray-primitive hit test.

In another general aspect, a method of operating a pipeline includes withdrawing data from one of input buffers including feedback input buffers corresponding to feedback routes; performing one or more data processing operations; and feeding back the processing result data to a corresponding feedback input buffer from among the feedback input buffers.

The performing of one or more data processing operations may include sequentially performing different data processing operations based on the withdrawn data.

One of the input buffers may be a FIFO buffer.

The capacities of the feedback input buffers may be determined based on the feedback routes.

The withdrawing of data from one of input buffers may include determining an input buffer from which data is to be withdrawn based on state signals received from the input buffers.

The state signals of the input buffers may include at least one of an HF signal, an EF signal, and an FF signal; and the withdrawing data from one of input buffers may include withdrawing the data preferentially from an input buffer whose state signal is the HF signal.

The withdrawing data from one of input buffers may include withdrawing the data preferentially from the feedback input buffers in response to the state signals of the input buffers being the same.

The data may be ray data; and the performing one or more data processing operations may include at least one of performing a ray-node hit test on the ray data; and performing a ray-primitive hit test on the ray data.

A non-transitory computer readable medium may store a program for executing the method using a computer.

In another general aspect, a pipeline includes an initial input buffer configured to receive initial data; functional blocks configured to perform one or more processing operations, feedback input buffers configured to receive fed back data from the functional blocks, wherein the capacities of the feedback input buffers are based on the capacities of the functional blocks.

Figure 1:
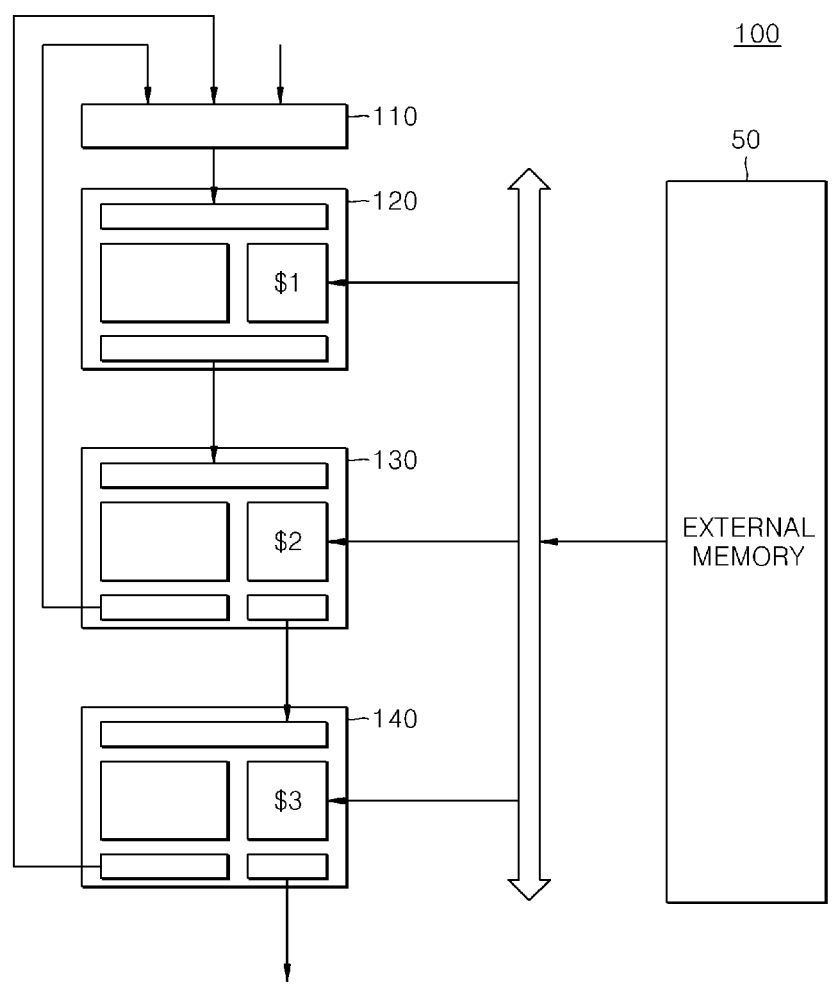
FIG. 1 is a diagram illustrating an example of a common pipeline system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a common pipeline system.

Referring to FIG. 1, a pipeline system 100 may include an input buffer 110 and a plurality of functional blocks 120, 130, and 140 for performing different data processings.

For example, as illustrated in FIG. 1, the pipeline system 100 may include a first functional block 120, a second functional block 130, and a third functional block 140. The first functional block 120 may perform a first data processing operation, the second functional block 130 may perform a second data processing operation, and the third functional block 140 may perform a third data processing operation.

However, the above is only an example for convenience sake, and the pipeline system 100 may include more or less functional blocks.

Referring to FIG. 1, the first functional block 120 may receive data from the input buffer 110 and may perform the first data processing operation on the received data.

The first functional block 120 may include a first cache memory $1 so that a part of the data required for the first data processing operation may be stored in the first cache memory $1. The data stored in the first cache memory $1 may also be the same as a part of the data stored in an external memory 50.

When the data required for the first data processing operation is not stored in the first cache memory $1, the first functional block 120 may access the external memory 50 to read the required data.

When the first functional block 120 accesses the external memory 50 to read the required data, data processing may be delayed in comparison with a case in which the data stored in the first cache memory $1 is read.

Then, the data on which the first data processing operation has been performed may be transmitted to the second functional block 130.

The second functional block 130 may receive the data on which the first data processing operation has been performed from the first functional block 120.

The second functional block 130 may perform a second data processing operation on the received data similar to the first functional block 120. The second functional block 130 may also include a second cache memory $2 and data required for the second data processing may be stored in the second cache memory $2.

The data on which the second data processing operation has been performed may be transmitted to the third functional block 140.

The third functional block 140 may perform a third data processing operation on the received data like the first and second functional blocks 120 and 130.

The third functional block 140 may also include a third cache memory $3 and data required for the third data processing may be stored in the third cache memory $3.

As described above, the pipeline system 100 illustrated in FIG. 1 may sequentially perform the first data processing operation, the second data processing operation, and the third data processing operation on the data input to the input buffer 110.

In the pipeline system 100, since the functional blocks 120, 130, and 140 may simultaneously perform data processings in parallel, data processing efficiency may be improved.

In an example, the pipeline system 100 may have feedback routes.

Referring to FIG. 1, the second functional block 130 and the third functional block 140 may respectively have input routes for feedback to the first functional block 120.

Thus, after the first functional block 120 and the second functional block 130 perform the first and second data processing operations on the input data, the processed data may be fed back to the first functional block 120. In addition, after the first functional block 120, the second functional block 130, and the third functional block 140 respectively perform the first, second, and third data processing operation on the input data, the processed data may be fed back to the first functional block 120.

In the pipeline system 100 including the feedback routes, although external new data is not input, when fed-back data is continuously transmitted, the input buffer 110 may reach a full state. Thus, an erroneous operation may be generated or all of the functional blocks may be stalled. This is referred to as a deadlock.

In this example, the pipeline system including the feedback routes may include a structure and a method capable of preventing overflow of the input buffer or deadlock of the pipeline system. This will be described with reference to the following drawings.

Figure 2:
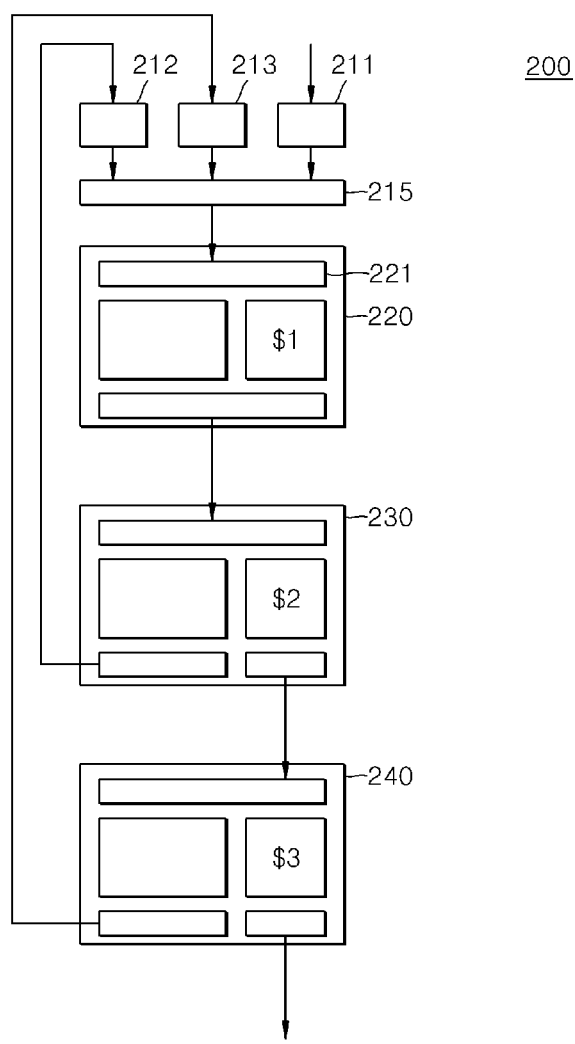
FIG. 2 is a diagram illustrating an example of a pipeline system.

FIG. 2 is a diagram illustrating an example of a pipeline system.

Referring to FIG. 2, a pipeline system 200 including feedback routes may include a plurality of input buffers 211, 212, and 213, a relay 215, and a plurality of functional blocks 220, 230, and 240.

Referring to FIG. 2, the plurality of input buffers 211, 212, and 213 receive data to be processed by the pipeline system 200.

For example, the number of input buffers may be N. Among the N input buffers, (N−1) input buffers may be feedback input buffers that receive data fed back by at least one of the plurality of functional blocks and one input buffer may be an input buffer that receives initial input data received from the outside.

In addition, at least one of the plurality of input buffers may be a first in first out (FIFO) buffer.

In FIG. 2, for convenience sake, the pipeline system 200 includes three input buffers that may be referred to as a first input buffer 211, a second input buffer 212, and a third input buffer 213. However, the number of input buffers is not limited thereto.

In addition, the pipeline system 200 may include M functional blocks. For convenience sake, the functional blocks included in the pipeline system 200 of FIG. 2 may be referred to as a first functional block 220, a second functional block 230, and a third functional block 240. However, the number of functional blocks is not limited thereto.

The first functional block 220, the second functional block 230, and the third functional block 240 may perform a first data processing operation, a second data processing operation, and a third data processing operation, respectively.

In an example, the first input buffer 211 may receive initial data received from the outside.

In addition, data processed by at least one of the plurality of functional blocks may be fed back to a predetermined feedback input buffer from among the feedback input buffers.

For example, as illustrated in FIG. 2, data processed by the second functional block 230 may be fed back to the second input buffer 212. In addition, data processed by the third functional block 240 may be fed back to the third input buffer 213.

Therefore, the pipeline system may separately include the input buffer that receives the initial data and may also include the feedback input buffers that receive feedback data in accordance with the feedback routes.

In addition, a number of input buffers may be equal to a number of data input routes of the pipeline system and a number of feedback input buffers may be equal to a number of feedback routes.

For example, the pipeline system of FIG. 2 may include a route (a first input route) through which the initial data is input from the outside, a route (a second input route) through which the data processed while passing through the first functional block 220 and the second functional block 230 is fed back and input, and a route (a third input route) through which the data processed while passing through the first functional block 220, the second functional block 230, and the third functional block 240 is fed back and input. Accordingly, three input buffers may be used.

The first input buffer 211 may load the data received using the first input route, that is, the initial data input from the outside. The second input buffer 212 may load the data fed back from the second functional block 230 using the second input route. The third input buffer 213 may load the data fed back from the third functional block 240 using the third input route.

Capacities of the first functional block 220, the second functional block 230, and the third functional block 240 may be N1, N2, and N3, respectively. The capacities of the functional blocks may be determined based on capacities of the input buffers included in the functional blocks, capacities of output buffers, and data processing capacities of operation units for performing the data processing operations in the functional blocks.

For example, when the number of data items maximally loaded in the input buffer included in the first functional block 220 is n1, the number of data items that may be simultaneously processed by the first functional block is n2, and the number of data items that may be maximally loaded in the output buffer of the first functional block is n3, the capacity N1 of the first functional block 220 may be n1+n2+n3.

Also, the capacity N2 of the second functional block 230 may be expressed as the sum of n4, the number of data items that may be maximally loaded in the input buffer of the second functional block, n5, the number of data items that may be simultaneously processed by the second functional block, and n6, the number of data items that may be maximally loaded in the output buffer of the second functional block.

Similarly, the capacity N3 of the third functional block 240 may be expressed as the sum of the number of data items that may be maximally loaded in the input buffer included in the third functional block, n7, the number of data items that may be simultaneously processed by the third functional block, n8, and the number of data items that may be maximally loaded in the output buffer included in the third functional block, n9, as similarly described above.

In another example, capacities of the feedback input buffers that receive and load the fed-back data may be determined based on the data input routes.

For example, in the case of the second input buffer 212, since the data processed while passing through the first functional block 220 and the second functional block 230 is fed back and input, the capacity of the second input buffer 212 may be the sum of the capacities of the first functional block and the second functional block. That is, the capacity of the second input buffer 212 may be N1+N2.

Similarly, in the case of the third input buffer 213, since the data processed while passing through the first functional block 220, the second functional block 230, and the third functional block 240 is fed back and input, the capacity of the third input buffer 213 may be the sum of the capacities of the first functional block, the second functional block, and the third functional block. That is, the capacity of the third input buffer 213 may be N1+N2+N3.

As described above, when the capacities of the input buffers are determined, it is possible to prevent deadlock of the pipeline system and overflow of the input buffers that receive and load the fed-back data.

For example, the maximum number of data items fed back and input through the third input route is equal to the sum of the capacities of the first, second, and third functional blocks regardless of latency caused by access to an external memory during the data processing operations.

Accordingly, when the capacity of the third input buffer 213 is determined as being equal to the sum of the capacities of the first, second, and third functional blocks, no overflow is generated.

In addition, the initial data input from the outside may properly be input by monitoring a state of an input buffer 221 so that no underflow occurs in the input buffer 221 included in the first functional block.

On the other hand, the relay 215 may determine data to be withdrawn to the first functional block 220 from among the data items loaded in the plurality of input buffers.

The relay 215 may receive state signals of the input buffers 211, 212, and 213 and may determine an input buffer from which the data is to be withdrawn based on the received state signals. Accordingly, the data loaded in the determined input buffer may be withdrawn to the first functional block 220, which will be described in detail with reference to FIGS. 4 and 5 hereinafter.

Figure 3:
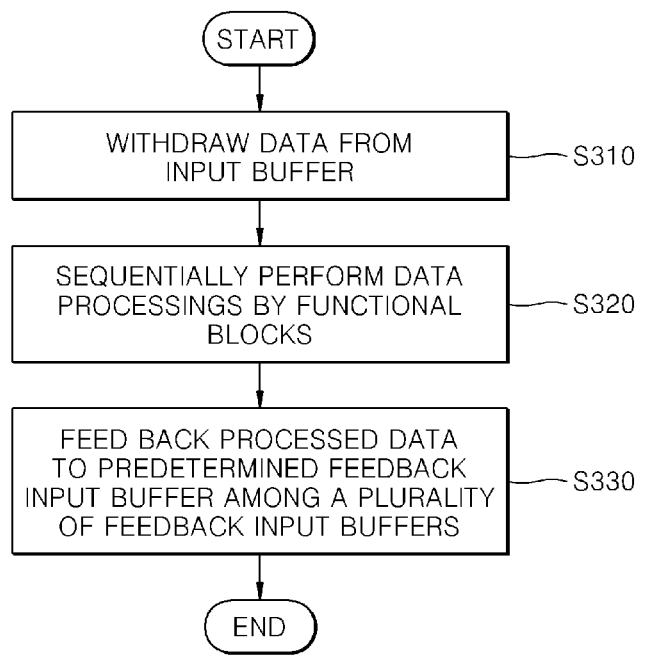
FIG. 3 is a diagram illustrating an example of a method of operating a pipeline system.

FIG. 3 is a diagram illustrating an example of a method of operating the pipeline system of FIG. 2.

The pipeline system 200 may withdraw data from the plurality of input buffers in operation S310.

In the pipeline system 200, the plurality of functional blocks may sequentially perform different data processing operations on the withdrawn data in operation S320.

For example, as illustrated in FIG. 2, when the plurality of functional blocks include the first functional block 220, the second functional block 230, and the third functional block 240, the pipeline system 200 may sequentially perform the first data processing operation, the second data processing operation, and the third data processing operation based on the input data.

The pipeline system 200 may feed back the processed data to a predetermined feedback input buffer from among the plurality of feedback input buffers in operation S330.

For example, as illustrated in FIG. 2, the second input buffer 212 may load the data fed back from the second functional block 230 using the second input route. The third input buffer 213 may load the data fed back from the third functional block 240 using the third input route.

Figure 4:
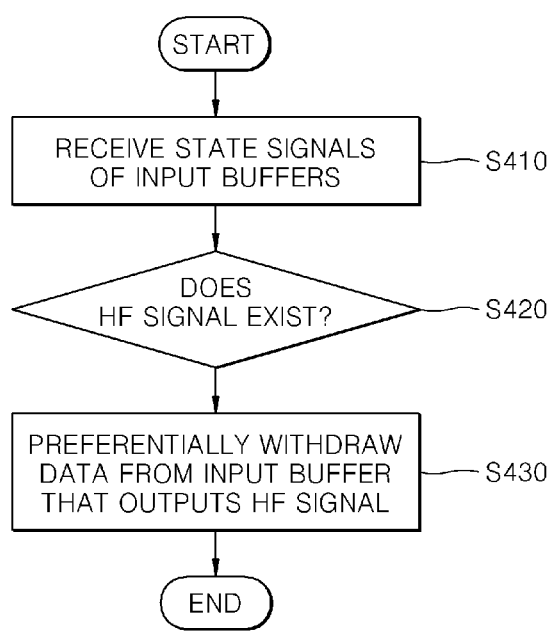
FIG. 4 is a diagram illustrating an example of a method of withdrawing data from a plurality of input buffers of a pipeline system.
Figure 5:
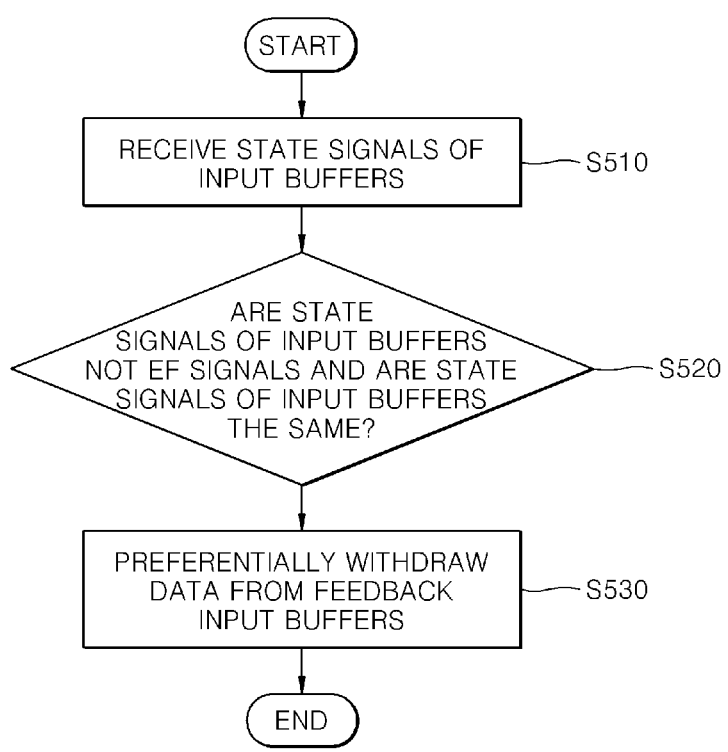
FIG. 5 is a diagram illustrating an example of a method of withdrawing data from a plurality of input buffers of a pipeline system.

FIGS. 4 and 5 are diagrams illustrating examples of a method of operating a pipeline system.

Referring to FIGS. 4 and 5, the relay 215 may receive the state signals of the input buffers in operations S410 and S510.

At this time, the state signal of each of the input buffers may be one of a half-full flag (HF) signal, an empty flag (EF) signal, and a full flag (FF) signal.

The relay 215 may determine whether an HF signal exists from among the received state signals in operation S420 to preferentially withdraw data loaded in an input buffer that outputs the HF signal from among the plurality of input buffers in operation S430.

An initial state of each of the input buffers may be an empty state. When data starts to be loaded in each of the input buffers, each of the input buffers may generate an HF signal. In addition, when the data is continuously loaded, each of the input buffers may generate an FF signal.

Since each of the input buffers cannot reach a full state until after they have reached a half-full state, it is possible to prevent each of the input buffers from reaching the full state by putting a priority on the HF signal.

In another example, if the state signals of the input buffers include only an FF signal and an EF signal, the relay 215 may preferentially withdraw data loaded in an input buffer that outputs the FF signal among the input buffers by putting a priority on the FF signal.

Referring to FIG. 5, the relay 215 may determine whether the received state signals of the input buffers are not the EF signals but the HF signals or the FF signals, and are the same signal for the input buffers, in operation S520.

When it is determined that the received state signals of the input buffers are the same, the relay 215 may preferentially withdraw the data loaded in the feedback input buffers by putting a priority on the feedback input buffers among all input buffers. That is, a priority may be put on input buffers to which the feedback data is input rather than the input buffer to which the initial data is input in operation S530.

In addition, the relay 215 may put the same priority on the feedback input buffers to which the feedback data is input. For example, when the second input buffer 212 and the third input buffer 213 are the feedback input buffers to which the feedback data is input and the second input buffer 212 and the third input buffer 213 are in half-full states, the relay 215 may alternately withdraw the data loaded in the second input buffer and the data loaded in the third input buffer.

Figure 6:
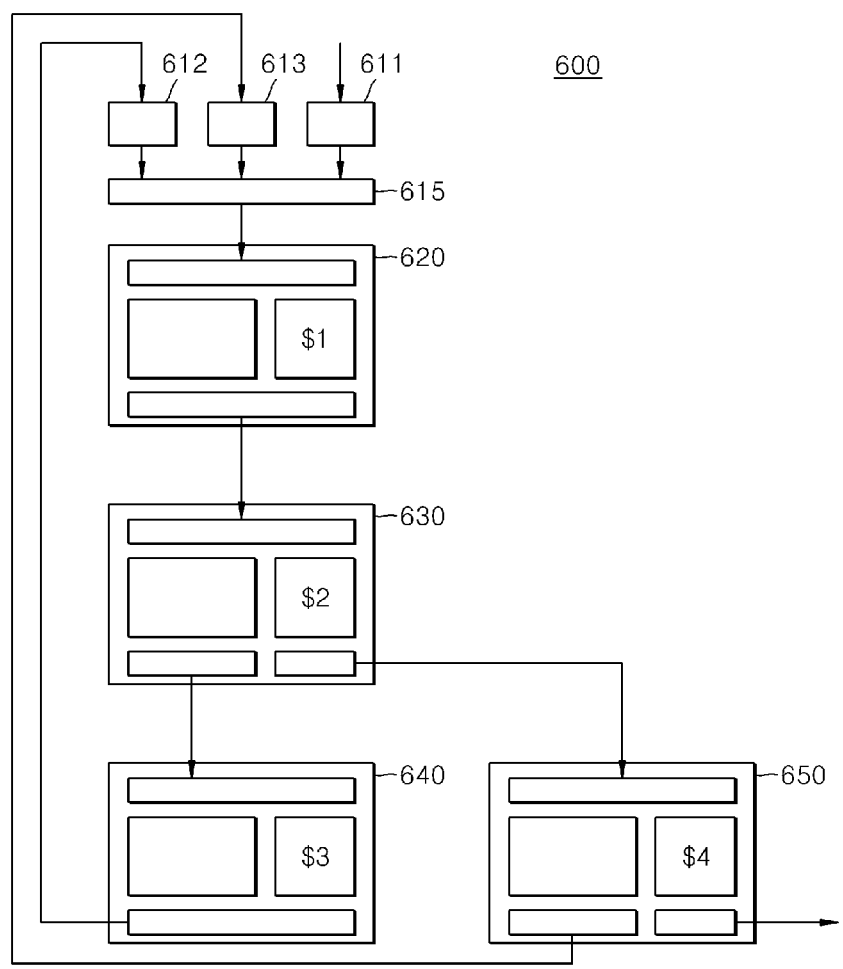
FIG. 6 is a diagram illustrating an example of a ray tracing processing system to which a pipeline system is applied.

FIG. 6 is a diagram illustrating an example of a ray tracing processing system to which a pipeline system is applied.

A ray tracing processing system 600, as shown in FIG. 6, may include a TRV unit and an IST unit. The TRV unit may be formed of a first functional block 620, a second functional block 630, and a third functional block 640 and the IST unit may be formed of a fourth functional block 650.

Accordingly, the first to third functional blocks 620, 630, and 640 may perform data processing operations for searching an acceleration structure, respectively, and the fourth functional block 650 may perform a data processing operation for a ray hit test.

In addition, referring to FIG. 6, a plurality of input buffers may input data to the TRV unit and may include a relay 615 for controlling a data input to the TRV unit.

A first input buffer 611 may receive generated ray data from a ray generating unit (not shown) to load the received ray data. The generated ray data may include primary ray data and ray data derived from a primary ray.

The first to third functional blocks 620, 630, and 640 may perform the data processing operations for traversal of the acceleration structure based on the received ray data.

For example, the first to third functional blocks 620, 630, and 640 may read information on the acceleration structure from cache memories $1, $2, and $3 or an external memory and may perform data processing operations for detecting a leaf node that a ray hits based on the read acceleration structure information.

At this time, the first to third functional blocks 620, 630, and 640 may perform a ray-node hit test on the input ray data. As illustrated in FIG. 6, the ray data may be fed back to the first functional block 620 in order to detect the leaf node that the ray hits as occasion demands.

For example, when the leaf node is not detected as a result of performing the ray-node hit test on one route included in the acceleration structure, in order to traverse another route, the ray data may again be fed back to the first functional block 620.

Data (ray data fed back from the TRV unit to the TRV unit again) fed back from the third functional block 640 may be input to a second input buffer 612.

Accordingly, since a capacity of the second input buffer 612 is determined based on a route of the data input to the second input buffer 612, the capacity of the second input buffer 612 may be equal to the sum of the capacities of the first, second, and third functional blocks 620, 630, and 640.

On the other hand, when the leaf node is detected, the ray data may be transmitted to the fourth functional block 650.

The fourth functional block 650 may perform a ray-primitive hit test.

For example, the fourth functional block 650 may determine which primitives a ray hits from among a plurality of primitives included in the leaf node based on primitive information read from the cache memory $4 or the external memory.

Accordingly, the primitives that the ray hits may be detected and hit points where the ray hits the detected primitives may be calculated.

As illustrated in the example of FIG. 6, after the fourth functional block 650 performs the ray-primitive hit test, the ray data may be fed back to the first functional block 620 as occasion demands.

For example, when the hit points where the ray hits the leaf node and the primitives are calculated by performing the ray-node hit test and the ray-primitive hit test on one route, the ray data may be fed back to the first functional block 620 again in order to perform the ray-node hit test and the ray-primitive hit test on another route.

Data, i.e. ray data fed back from the IST unit to the TRV unit again, fed back from the fourth functional block 650 may be input to a third input buffer 613.

Accordingly, since a capacity of the third input buffer 613 is determined based on a route of the data input to the third input buffer 613, the capacity of the third input buffer 613 may be equal to the sum of the capacities of the first, second, and fourth functional blocks 620, 630, and 650.

On the other hand, the relay 615 may determine data to be withdrawn to the first functional block 620 from among the data items loaded in the first input buffer 611, the second input buffer 612, and the third input buffer 613.

In this example, the relay 615 may receive state signals of the input buffers and may determine an input buffer from which data is to be withdrawn based on the received state signals. Accordingly, the data loaded in the determined input buffer may be withdrawn to the first functional block 620.

The state signals of the input buffers may include the HF signal, the EF signal, and the FF signal.

The relay 615 may preferentially withdraw data loaded in an input buffer that outputs the HF signal from among the three input buffers 611, 612, and 613. Accordingly, it is possible to prevent the input buffer from reaching a full state.

In addition, the relay 615 may put a higher priority on the second input buffer 612 that loads the data fed back from the TRV unit and the third input buffer 613 that loads the data fed back from the IST unit than on the first input buffer 611 that loads the data input from the ray generating unit.

That is, the ray tracing processing system 600 may preferentially process the fed-back ray data and may properly receive the ray data input from the ray generating unit in accordance with a processing state. Accordingly, it is possible to prevent deadlock and underflow of the ray tracing processing system.

FIG. 6 illustrates an example of the ray tracing processing system. However, the present invention is not limited to the above and the configuration and method described with reference to FIG. 6 may be applied to another pipeline system.

While the disclosure generally describes first, second, and third processing operations being performed by the first, second, and third functional blocks, the number of operations performed and the number of functional blocks is variable. For example, the first, second, and third functional blocks may each perform the same data processing operation.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A pipeline, comprising:
   input buffers;
   a relay configured to control withdrawal of data stored in the input buffers; and
   functional blocks configured to perform one or more processing operations,
   wherein at least two of the input buffers are feedback input buffers corresponding to feedback routes, and
   wherein at least two of the functional blocks are configured to feed back processing result data to corresponding ones of the feedback input buffers.

2. The pipeline of claim 1, wherein:
   the one or more processing operations comprises different processing operations;
   the functional blocks are configured to perform the different processing operations sequentially and based on the data received from the input buffers; and
   at least two of the sequentially performed data operations are performed by different functional blocks.

3. The pipeline of claim 1, wherein at least one of the input buffers is a first in first out (FIFO) buffer.

4. The pipeline of claim 1, wherein the number of the feedback routes is equal to the number of the feedback input buffers.

5. The pipeline of claim 1, wherein capacities of the feedback input buffers are determined based on the feedback routes.

6. The pipeline of claim 5, wherein the capacities of the feedback input buffers are equal to sums of capacities of the functional blocks through which the fed-back data passes.

7. The pipeline of claim 1, wherein the relay is configured to control withdrawal of the data based on state signals received from the input buffers.

8. The pipeline of claim 7, wherein:
   the state signals of the input buffers comprise at least one of a half-full flag (HF) signal, an empty flag (EF) signal, and a full flag (FF) signal; and
   the relay is configured to preferentially withdraw data of an input buffer whose state signal is the HF signal.

9. The pipeline of claim 8, wherein the relay is configured to preferentially withdraw data from the feedback input buffers in response to the state signals of the input buffers being the same.

10. The pipeline of claim 1, wherein:
    data received from the input buffers is ray data and;
    the functional blocks are configured to perform at least one of a ray-node hit test and a ray-primitive hit test.

11. A method of operating a pipeline, the method comprising:
    withdrawing data from one of input buffers comprising feedback input buffers corresponding to feedback routes;
    performing one or more data processing operations using functional blocks; and
    feeding back, from at least two of the functional blocks, processing result data to corresponding ones of the feedback input buffers.

12. The method of claim 11, wherein:
    the performing one or more data processing operations comprises sequentially performing different data processing operations based on the withdrawn data; and
    at least two of the sequentially performed data operations are performed by different functional blocks.

13. The method of claim 11, wherein one of the input buffers is a FIFO buffer.

14. The method of claim 11, wherein capacities of the feedback input buffers are determined based on the feedback routes.

15. The method of claim 11, wherein the withdrawing data from one of input buffers comprises determining an input buffer from which data is to be withdrawn based on state signals received from the input buffers.

16. The method of claim 15, wherein:
    the state signals comprise at least one of an HF signal, an EF signal, and an FF signal; and
    the withdrawing data from the one of input buffers comprises withdrawing the data preferentially from an input buffer whose state signal is the HF signal.

17. The method of claim 16, wherein the withdrawing data from one of input buffers comprises withdrawing the data preferentially from the feedback input buffers in response to the state signals of the input buffers being the same.

18. The method of claim 11, wherein:
the data is ray data; and
the performing one or more data processing operations comprises at least one of:
performing a ray-node hit test on the ray data; and
performing a ray-primitive hit test on the ray data.

19. A non-transitory computer readable medium storing a program for executing the method of claim 11 using a computer.

20. A pipeline comprising:
input buffers comprising an initial input buffer configured to receive initial data;
functional blocks configured to perform one or more processing operations; and
feedback input buffers configured to receive fed back data from the functional blocks,
wherein at least two of the functional blocks are configured to feed back processing result data to corresponding ones of the feedback input buffers, and
the capacities of the feedback input buffers are based on the capacities of the functional blocks.

* * * * *